United States Patent
Fevre et al.

(10) Patent No.: US 9,277,841 B2
(45) Date of Patent: Mar. 8, 2016

(54) FOOD PROCESSOR WITH A MAGNETIZED TOOL

(71) Applicant: HAMEUR S.A., Luxembourg (LU)

(72) Inventors: Loïc Xavier Fevre, Sanvignes les Mines (FR); Nicolas Lapray, Montceau en Bourgogne (FR)

(73) Assignee: HAMEUR S.A., Luxembourg (LU)

( * ) Notice: Subject to any disclaimer, the term of this patent is extended or adjusted under 35 U.S.C. 154(b) by 343 days.

(21) Appl. No.: 13/629,592

(22) Filed: Sep. 27, 2012

(65) Prior Publication Data

US 2013/0075507 A1    Mar. 28, 2013

(30) Foreign Application Priority Data

Sep. 28, 2011 (FR) .................................... 11 58703

(51) Int. Cl.
| | |
|---|---|
| *A47J 43/08* | (2006.01) |
| *B02C 23/00* | (2006.01) |
| *A47J 43/07* | (2006.01) |
| *A47J 27/00* | (2006.01) |

(52) U.S. Cl.
CPC ............ *A47J 43/0722* (2013.01); *A47J 27/004* (2013.01); *A47J 43/0716* (2013.01)

(58) Field of Classification Search
CPC ... A47J 43/046; A47J 43/255; A47J 43/0716; A47J 43/0722; A47J 27/004; B02C 17/02; B02C 13/205; A23G 9/12
USPC ........... 241/37.5, 91, 92, 278.1, 282.1, 282.2; 366/144, 205, 206; 99/510, 513
See application file for complete search history.

(56) References Cited

U.S. PATENT DOCUMENTS

| | | | | |
|---|---|---|---|---|
| 3,941,517 | A | * | 3/1976 | Miyahara ...................... 417/420 |
| 4,629,131 | A | * | 12/1986 | Podell .............................. 241/36 |
| 4,817,878 | A | * | 4/1989 | Shibata ...................... 241/282.2 |
| 5,183,336 | A | * | 2/1993 | Poltorak et al. ............... 366/273 |
| 5,379,953 | A | * | 1/1995 | Rebordosa et al. ......... 241/101.2 |
| 5,768,978 | A | * | 6/1998 | Dorner et al. ................... 99/348 |
| 5,875,706 | A | * | 3/1999 | Borger et al. ................... 99/492 |
| 2003/0197080 | A1 | | 10/2003 | Karkos, Jr. et al. |
| 2005/0178864 | A1 | * | 8/2005 | Unteregger ................ 241/101.1 |
| 2010/0290308 | A1 | * | 11/2010 | Terentiev ...................... 366/143 |
| 2010/0326284 | A1 | | 12/2010 | Volz et al. |
| 2011/0180645 | A1 | | 7/2011 | Wanat et al. |
| 2011/0186668 | A1 | * | 8/2011 | Seidler et al. ................... 241/98 |

FOREIGN PATENT DOCUMENTS

FR           2641458 A1      7/1990

* cited by examiner

*Primary Examiner* — Faye Francis
*Assistant Examiner* — Onekki Jolly
(74) *Attorney, Agent, or Firm* — Im IP Law PLLC; C. Andrew Im

(57) ABSTRACT

The invention refers to a mechanical food treatment processor comprising a driving block topped by a bowl. The driving block comprises a motor connected to a driving device having a substantially vertical axis. The bottom of the bowl comprises an opening to allow the passage of the driving device. The processor further comprises a food treatment tool having a fitting device to be fitted onto the driving device and a magnetizing device exerting a force of attraction between the food treatment tool and the bowl. Thus, it is possible to tilt the bowl with the claimed invention while preventing the treatment tool from inopportunely falling. The tool remains easily dismountable from the bowl and the driving device.

11 Claims, 1 Drawing Sheet

FOOD PROCESSOR WITH A MAGNETIZED TOOL

RELATED APPLICATIONS

This application claims priority from French Patent Application No. 11 58703 filed Sep. 28, 2011, which is incorporated herein by reference in its entirety.

TECHNICAL FILED OF THE INVENTION

The present invention refers to a mechanical food processor. More precisely, the present invention refers to a food processor such as a blender or a "cutter".

BACKGROUND OF THE INVENTION

This type of processor is known in the prior art. It typically comprises a driving block topped by a bowl. The driving block comprises a driving shaft mobile in rotation about an axis which is vertical or nearly vertical. Said shaft is disposed in the bowl through an opening in the bottom of said bowl. A treatment tool, generally comprising cutting blades, is placed onto the driving shaft. The cutting blades can thus ensure the cutting, the mixing or the emulsion of food placed in the bowl, such as for example fruits or vegetables. Such a food processor is described for example in document FR2641458.

The bowl is in general removable from the driving block. Thus, after the operations of cutting or mixing, said bowl can be raised in order to transvase its contents in another container. For this purpose, as illustrated in document FR2641458, the bowl can be equipped with a handle.

In order to simplify the operations of manufacturing and assembling the processor, it is usual that the treatment tool, such as a knife, should simply be fitted onto the driving shaft and maintained thereon by gravity. When the bowl is raised from the base, the knife can be easily dissociated from the driving shaft by a movement along the axis of said shaft. The knife can then be manually removed from the bowl in order not to fall when pouring the mixed preparation.

However, in certain circumstances, the knife can prove to be difficult to remove from the mixed preparation. It is for example the case when said preparation is hot for the user is likely to burn his/her hand when plunging it therein.

Document US2011/0180645 relates a knife able to be snapped onto a driving shaft. Thus, such a knife is not likely to fall when tilting the processor. However, this knife is provided with relatively complex snapping means.

Processors such as "blenders" are also known in the prior art, in particular those adapted to the preparation of hot soups. In these processors, the knife is firmly fixed to the bottom of the bowl. However, this type of knife is generally more fragile and more difficult to clean than a removable knife.

OBJECT AND SUMMARY OF THE INVENTION

The present invention aims at solving these problems by proposing a bowl provided with a removable knife, while preventing the knife from falling when tilting said bowl.

More precisely, the present invention refers to a mechanical food processor, said processor comprising a driving block topped by a bowl, the driving block comprising a motor connected to a rotation driving means having a substantially vertical axis, a bottom of the bowl comprising an opening allowing the passage of the driving means, the processor moreover comprising a food treatment tool provided with fitting means to be fitted onto the driving means, said processor being characterized in that it is provided with a magnetizing device exerting a attraction force between the food treatment tool and the bowl.

By "rotation driving means having a substantially vertical axis", one understands that the axis of rotation can be vertical or slightly tilted with respect to the vertical. Preferably, the angle of inclination is not higher than 30°.

In a preferential way, the magnetizing device comprises a permanent magnet, said magnet being supported by the tool or the bowl.

According to an embodiment of the invention, the magnetizing device comprises a permanent magnet located under the bottom of the bowl, cooperating with a ferromagnetic element supported by the tool. According to a preferred embodiment of the invention, the ferromagnetic element supported by the tool is a food cutting blade. In this case, said blade is preferentially located in the lower part of the tool.

According to another embodiment of the invention, the magnetizing device comprises a permanent magnet located in the lower part of the tool, cooperating with a ferromagnetic element supported by the bowl. This ferromagnetic element is for example a metal bottom of the bowl.

According to an alternative embodiment of the invention, the magnetizing device comprises a first permanent magnet supported by the bowl, cooperating with a second permanent magnet supported by the tool.

In a preferential way, the bowl moreover comprises a food heating device. According to an alternative embodiment of the invention, said heating device is a resistive heating means located under the bottom of the bowl.

According to another alternative embodiment of the invention, the processor is provided with a device for heating the bowl by induction. In this case, the food treatment tool can be made out of a material able to release heat under the action of a magnetic field, which enables it to heat food contained in the bowl.

BRIEF DESCRIPTION OF THE DRAWINGS

The invention will be better understood when reading the following description and examining the annexed Figures. These Figures are given as an indication and by no means as a restriction of the invention. The Figures show.

DETAILED DESCRIPTION OF THE EMBODIMENTS

Figure 1:
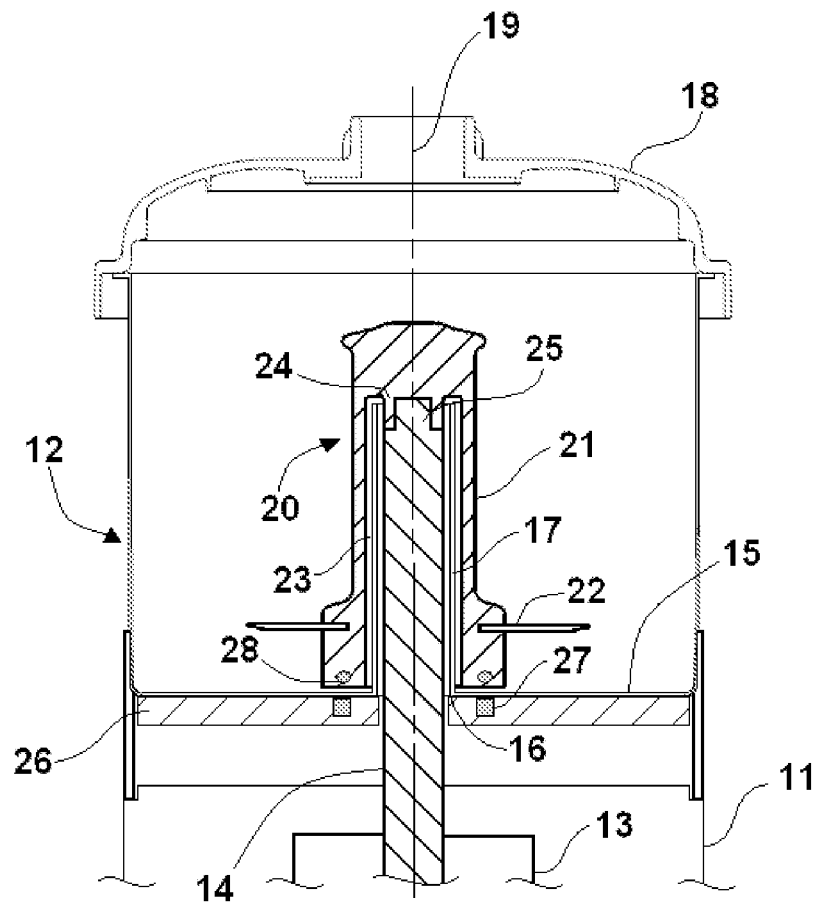
FIG. 1: a schematic sectional view of a mechanical food processor according to an embodiment of the invention.

FIG. 1 shows a schematic sectional view of a mechanical food processor 10 according to an embodiment of the invention. The processor 10 comprises a driving block 11 topped by a bowl 12. The bowl 12 itself is topped by a lid 18.

The driving block comprises a motor 13 schematically represented in FIG. 1. The motor 13 is connected to a driving means, in fact a driving shaft 14, having a substantially cylindrical form around a substantially vertical axis 19.

A bottom 15 of the bowl 12 comprises an opening 16 allowing the passage of the driving shaft 14. In the example in FIG. 1, the opening 16 is prolonged by a conduit 17 located inside the bowl 12. When the bowl is mounted on the driving block, the conduit extends along the same axis 19 as the shaft 14.

The processor 10 moreover comprises a food treatment tool, in fact a knife 20. The knife 20 comprises a support 21 provided with at least one blade 22. The action of the knife 20 allows in particular to reduce to pieces or to fine particles the food introduced into the bowl 12.

The support 21 comprises a central cavity 23 having a substantially cylindrical shape, which enables said support to be fitted onto the conduit 17 and the shaft 14. A bottom 24 of the cavity 23 is provided with assembling means for the assembly with an end 25 of the shaft 14, so that said shaft is able to rotate the knife 20 about the axis 19.

Preferably, these assembling means allow to disassemble the knife 20 by pulling it upwards along the axis 19. These means are for example flat parts on the end 25 of the shaft 14, cooperating with complementary forms on the bottom 24. Thus, the knife 20 can be easily dismounted for cleaning the bowl 12.

In addition, in the example represented in FIG. 1, the bowl 12 is provided with a food heating device 26. The device 26 is placed for example under the bottom 15. This device 26 is for example a heating resistance.

The device 26 enables to heat or cook food in the bowl 12. The combined action of the knife 20 and the device 26 thus enables to carry out hot fluid preparations, such as soups or sauces.

For this purpose, it is advantageous to provide the bowl 12 with means such as a side handle (not represented) and/or a pourer (not represented), which facilitate the transfer of the contents of said bowl 12 into another container.

During such an operation of transfer, the bowl 12 is removed from the driving block 11 and the knife 20 is dissociated from the shaft 14. When the bowl 12 is tilted in order to pour its contents, the knife 20 is likely to slip along the conduit 17 and to fall. Such a fall of the knife could be awkward and dangerous for the user. In addition, if the contents in the bowl 12 are at a high temperature, said user cannot easily remove the knife manually before tilting the bowl.

In order to prevent the knife 20 from inopportunely falling when tilting the bowl 12, the processor 10 is provided with a magnetizing device exerting a force of attraction between the knife 20 and the bowl 12. More precisely, the bowl 12 is provided with a permanent magnet 27, located under the bottom 15. It can be for example an annular magnet, disposed around the axis 19. In an alternative embodiment, several magnets 27 can be distributed around the axis 19.

The magnet 27 cooperates with a part 28 supported by the support 21 of the knife 20, for example a ferromagnetic material ring opposite the magnet.

Figure 2:
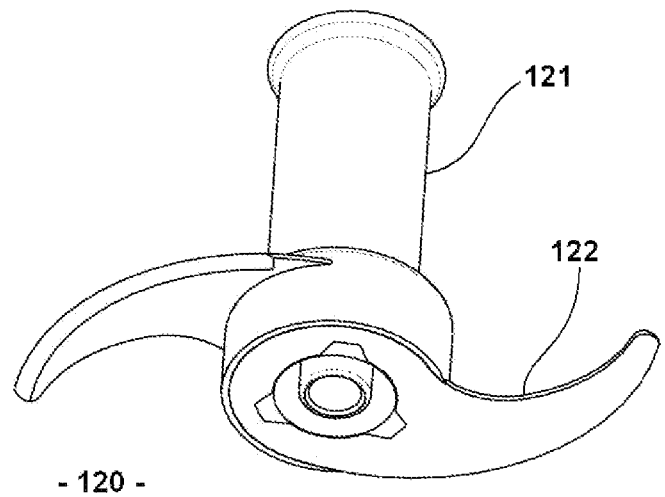
FIG. 2: a perspective view of a food treatment tool according to an embodiment of the invention.

FIG. 2 shows an alternative embodiment 120 of the food treatment tool of the processor 10. The tool 120 is a knife which comprises a support 121 provided with at least one blade 122. The blade 122 is located in the lower part of the knife 120, so as to be close to the bottom 15 of the bowl when the processor 10 is working.

The blade 122 is made out of a ferromagnetic material, such as a stainless steel. The blade 122 can thus cooperate with the magnet 27 to exert a force of attraction between the bowl 12 and the knife 120.

According to an alternative embodiment to that in FIG. 1, the permanent magnet can be supported by the tool 20 and cooperate with a ferromagnetic part of the bowl, for example the bottom 15 if it is made out of a suitable material such as a steel.

The force of attraction of the magnet 27 is preferentially selected so as to be sufficiently weak in order to enable a user to manually remove the tool 20 from the bowl 12, by translating it along the axis of the conduit 17.

In addition, the force of attraction of the magnet 27 must be sufficient to compensate for the weight of the tool 20 when tilting the bowl 12. Preferentially, the force of attraction of the magnetizing device is selected to be at least equal to the weight of the treatment tool, so as to retain said tool when the bowl is turned upside down. Accordingly, it is preferable to make the tool 20 out of relatively light materials, so as to have the lightest possible weight.

Regarding food heating, in an alternative embodiment to that in FIG. 1, the processor 10 is provided with an induction heating device. For example, the driving block 11 can be provided with an induction coil (not represented) opposite the bottom 15 of the bowl 12.

In this case, food heating can be performed via the bottom 15. Said bottom 15 must then made out of a ferromagnetic material adapted to release heat to the food under the action of a magnetic field.

According to an alternative embodiment, the knife 20, in particular the support 21, is made out of a ferromagnetic material. In this case, it is the support 21 that enables to heat the food contained in the bowl 12 under the action of the induction coil.

Although the principle of the invention has been illustrated above within the framework of a processor 10 such as a blender, it can be applied to any processor comprising a bowl and a removable food treatment tool. For example, the cutting blades (22, 122) can be replaced by mixing blades or another similar tool.

In the same way, the interest of the invention is not limited to processors provided with a food heating device.

The invention claimed is:

1. Mechanical food treatment processor, comprising:
    a driving block topped by a bowl and comprising a motor connected to a rotation driving device having a substantially vertical axis;
    a bottom of the bowl comprising an opening to allow the passage of the driving device;
    a food treatment tool comprising a fitting device to be fitted onto the driving device; and
    a magnetizing device, comprising two parts, a first part being located on the bowl and a second part being located on the food treatment tool, exerting a force of attraction between the food treatment tool and the bowl to maintain the food treatment tool in the bowl while tilting the bowl, after removing the bowl from the driving block.

2. The processor of claim 1, wherein the magnetizing device comprises a permanent magnet supported by the food treatment tool or the bowl.

3. The processor of claim 2, wherein the magnetizing device comprises a permanent magnet positioned under the bottom of the bowl and cooperating with a ferromagnetic element supported by the food treatment tool.

4. The processor of claim 3, wherein the ferromagnetic element supported by the food treatment tool is a food cutting blade.

5. The processor of claim 2, wherein the magnetizing device comprises a permanent magnet positioned at a lower part of the tool and cooperating with a ferromagnetic element of the bowl.

6. The processor of claim 2, wherein the magnetizing device comprises a first permanent magnet supported by the bowl and cooperating with a second permanent magnet supported by the food treatment tool.

7. The processor of claim 1, wherein the bowl comprises a food heating device.

8. The processor of claim 7, wherein the food heating device is a resistive heating device positioned under the bottom of the bowl.

9. The processor of claim 7, further comprising an induction heating device.

10. The processor of claim 9, wherein the food treatment tool is constructed of a material operable to release heat under the action of a magnetic field.

11. The processor of claim 1, wherein the force of attraction of the magnetizing device is selected to be at least equal to the weight of the food treatment tool.

\* \* \* \* \*